Oct. 15, 1929.   W. H. PETERSÉN   1,731,394
ALTERNATING CURRENT MOTOR
Filed Oct. 5, 1927
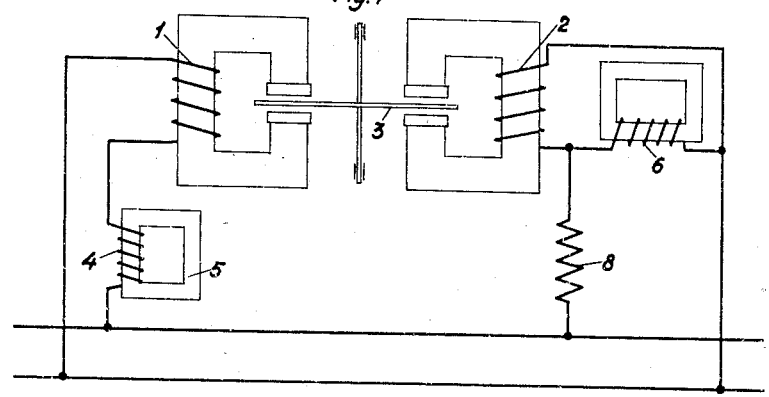
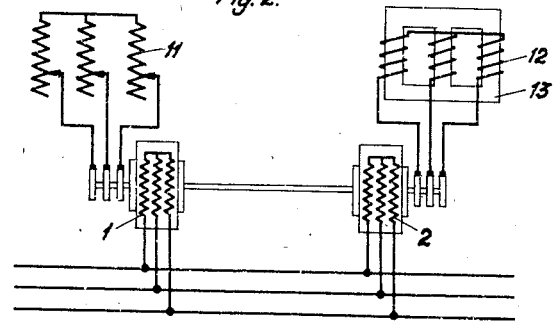
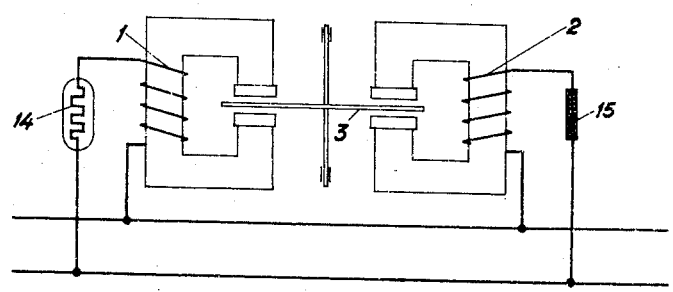
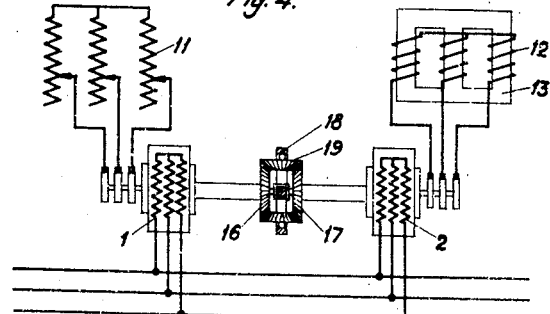
INVENTOR
Wilhelm Henning Petersén
BY Wm Wallace White
ATTORNEY Patented Oct. 15, 1929

1,731,394

UNITED STATES PATENT OFFICE

WILHELM HENNING PETERSÉN, OF VASTERAS, SWEDEN, ASSIGNOR TO ALLMÄNNA SVENSKA ELEKTRISKA AKTIEBOLAGET, OF VASTERAS, SWEDEN, A CORPORATION OF SWEDEN

ALTERNATING-CURRENT MOTOR

Application filed October 5, 1927, Serial No. 224,058, and in Sweden June 21, 1927.

My invention relates to an electric alternating current motor which has the property of remaining at standstill when it is fed from a certain normal voltage and to run in either direction when the voltage is raised or lowered from the said normal value. Such a motor is particularly adapted to control voltage or speed regulating devices, induction regulators, electric furnace regulators, and the like.

The characteristic feature of the said motor is that it has two operating windings, arranged on the same iron core or on different iron cores and acting on one rotor or on mechanically connected rotors, the forces exerted by said windings on the rotating part neutralizing each other at a certain normal voltage, while the admittances of the circuits of said windings are variable as to value, phase, or both, at variable voltage. The torques produced by the two operating windings depend on the current, flux, number of turns and phase displacement between the two first-named quantities, and all these quantities should thus be so chosen as to cause the torques to be equal and oppositely directed at the normal voltage. When the voltage is raised for both circuits, the admittance in one of the circuits is for instance increased while that of the other is decreased, kept constant, or increased to a smaller degree. The consequence will be that the current in the former winding increases more rapidly than in the latter, and if other quantities are substantially constant, the torque produced by the former winding will increase more rapidly than that of the latter, so that the motor will begin to rotate in a corresponding direction. The variable admittance is preferably obtained by the presence of magnetically saturated material.

Four different forms of my invention are diagrammatically illustrated in the accompanying drawing in Figs. 1, 2, 3, and 4.

Referring to Fig. 1, the two windings 1, 2 counteracting each other are arranged for single-phase currents and act on a common rotor 3 according to the Ferraris principle, i. e. part of the flux is "shaded" so as to produce a torque. The two torques counteract each other. In series with the winding 1, there is a coil 4 having an iron core 5 which is saturated for a certain voltage. In parallel with the winding 2, there is a similar coil 6 with an iron core 7, and the two conductors 2 and 6 are connected through a resistance 8 without iron to the same mains as the conductors 1 and 4.

If the torques exerted on the disc 3 by the two windings 1, 2 keep each other in equilibrium at the presumed normal voltage, and the voltage is then increased, the major portion of this increase will be absorbed by the winding 1, because a small increase in the voltage on the coil 4 corresponds to a large increase in the current on account of the saturation of the iron. In the right half of the motor, on the other hand, the resistance 8 will absorb the major portion of the increase in voltage, as the iron core 7 causes an increase in the total admittance of the parallel branches and thus a relative decrease in the voltage drop. The voltage on the winding 1 will thus increase much more rapidly than that on the winding 2, and as a consequence, the torque exerted by the former becomes predominant and causes a rotation of the disc 3 in a certain direction. If the total voltage is decreased all the aforesaid effects will be reversed and the disc 3 rotated in the opposite direction.

It is obvious, that both of the coils 4 and 6 are not necessary for effecting the desired action. If either of them is removed, the increase of voltage is quite uniformly distributed on the corresponding side, and as it is distributed in a non-uniform manner on the other side, the consequence still will be a difference between the two torques. The action, however, will be stronger, if both coils are used.

The arrangement may be applied as well to polyphase as to monophase systems. As an example, Fig. 2 shows an application to a three-phase system. The stator windings 1, 2 of two motors are connected directly to the same mains, while the rotors are mechanically connected together. In the rotor circuit of the motor having the stator winding 1, there is inserted a resistance 11 which is non-inductive or at least without iron core. The rotor circuit of the other motor contains an inductance 12 having an iron core 13. In order not to make the power factor in the last mentioned circuit too low, the iron core 13 may have comparatively high hysteresis losses. At any rate, the windings and resistances should be so dimensioned as to cause the torques to compensate each other for a certain normal voltage. For an increase in the voltage, the current rises in both motors, but on account of the presence of saturated iron in one of the rotor circuits, the rise of current and particularly the rise of torque will be unequal in the two motors. Also in this case the result will thus be a rotation in one direction for an increased and in the other for a reduced voltage.

Instead of inductances containing saturated iron there may also be used ohmic resistances having different coefficients of temperature. An example of such a connection is shown in Fig. 3, where 14 is an ohmic resistance having a high temperature coefficient, for instance an iron wire in a hydrogen atmosphere, and 15 a resistance having a low temperature coefficient, for instance a carbon rod. The members 1, 2, 3 correspond to those of Fig. 1.

Instead of rigidly coupling together two rotors, as in Fig. 2, so as to keep both stationary at normal voltage, two such rotors 3 may be connected through a differential gear, as shown in Fig. 4. When the two gear wheels 16, 17 coupled to the rotors move at equal speed in opposite directions, the spider 18 carrying the pinions 19 remains stationary, corresponding to normal voltage. A rise or lowering of voltage causes a rotation of said spider in one sense or in the other.

I claim as my invention:—

An alternating current induction motor comprising a common rotor, two stators, an inductance coil with an iron core, a resistance, and a second inductance coil with an iron core, the winding of one stator being connected to a line over the first coil and the winding of the other stator being connected to the same line over the resistance and in parallel with the second inductance coil.

In testimony whereof I have signed my name to this specification.

WILHELM HENNING PETERSÉN.